United States Patent
Cox

[15] 3,654,597
[45] Apr. 4, 1972

[54] COMMAND BAR MECHANISM FOR FLIGHT DIRECTOR INDICATOR AIRCRAFT INSTRUMENT

[72] Inventor: Ronald E. Cox, Cedar Rapids, Iowa
[73] Assignee: Collins Radio Company, Cedar Rapids, Iowa
[22] Filed: Aug. 7, 1970
[21] Appl. No.: 61,953

[52] U.S. Cl. .................................340/27 NA, 340/108 R
[51] Int. Cl. ..................................................G08g 5/02
[58] Field of Search ...............340/27 R, 27 AT, 27 NA; 343/108 R, 108 SM, 112 PT, 112 R; 73/178 R

[56] References Cited

UNITED STATES PATENTS

| | | | |
|---|---|---|---|
| 3,094,971 | 6/1963 | Guarino et al. | 340/27 AT |
| 3,162,834 | 12/1964 | Schweighofer et al. | 340/27 AT |
| 3,474,408 | 10/1969 | Jacobson | 340/27 AT |
| 2,932,024 | 4/1960 | Santangelo | 340/27 NA |

Primary Examiner—Kathleen H. Claffy
Assistant Examiner—Randall P. Myers
Attorney—Richard W. Anderson and Robert J. Crawford

[57] ABSTRACT

A compact positioning mechanism for an indicator assembly of the type comprising first and second bar members arranged in a V-like configuration and collectively defining a command plane which is both rotatable about and transversely displaceable with respect to a reference axis. A pair of ring members, each formed with a camming surface, carry the respective bar members on a cam follower pivotably mounted on one ring and in camming engagement with the cam surface on the other. Rotation of the command plane is achieved through like rotation of the two rings while displacement transverse of the reference axis is achieved by relative rotation between the two rings.

8 Claims, 3 Drawing Figures

COMMAND BAR MECHANISM FOR FLIGHT DIRECTOR INDICATOR AIRCRAFT INSTRUMENT

This invention relates generally to aircraft steering command instrumentation and more particularly to a mechanism and driving means for pictorially displaying steering command indications.

The present invention is particularly applicable to an improved means of positioning steering command indices in a type of indicator such as described and claimed in U.S. Pat. No. 3,162,834 to Schweighofer et al., which relates to a combination attitude and steering command instrument of the type referred to in the art as an attitude director indicator or flight director indicator. These types of instruments present pitch, bank and composite command indications by means of the positioning of certain indices with respect to a fixed reference which might represent the aircraft. When the steering indices are "centered" with respect to the reference, the interpreted command is zero. Commands relating to pitching motions up or down, or left and right bank, are appropriately and pictorially displayed by the relative positions between the command indices and the fixed reference such that the pilot may instinctively respond to the command by "centering" or "zeroing" the command indices with respect to the reference.

The Schweighofer et al., patent provides a pictorial display by means of a fixed generally delta-shaped reference symbol which represents the nose of the aircraft. First and second command bar indicators which compositely define a V-shaped configuration cooperate with the transverse extremes of the delta aircraft reference symbol to indicate pitch and bank commands. For a condition of zero command, the V-bar command indicator assembly is juxtaposed with the transverse extremes of the fixed aircraft symbol. As described in the Schweighofer et al patent, a pure bank command is presented by a rotation of the V-bar assembly such that the plane defined thereby is tilted with respect to the aircraft reference symbol. Pitch commands are presented by an upward displacement of the plane defined by the V-bar command assembly along with appropriate upward pitching of the apex of the V defined by the command assembly. The entire assembly is three-dimensional so as to provide a realistic perspective presentation to the observer. The V-bar command assembly has been referred to as a "highway in the sky" upon which it is desired to fly the aircraft as represented by the fixed delta symbol. A pitch-up command is, therefore, conveyed by an upward displacement of the plane defined by the command bar assembly along with a pitch-up motion of the apex of the V defined by the assembly such that the instinctive command is to fly the aircraft up and on to the desired path. Conversely, a pitch-down command is conveyed by a downward displacement of the plane defined by the command bar assembly along with a pitch-down motion of the apex of the V defined by the assembly such that the instinctive command is to fly the aircraft down on to the desired flight path. This philosophy is discussed in detail in the above referenced patent.

The present invention has as an object thereof the provision of a unique positioning mechanism for a command bar assembly of the type employed in the above referenced patent by means of which the aforedescribed desired command bar positioning may be effected in a relatively simple mechanical drive mechanism employing a minimum of assembled elements and which may be embodied in a particular instrument assembly in an extremely compact manner.

The present invention is featured in the provision of first and second ring assemblies each of which is individually rotatable about the longitudinal horizontal line of sight axis of the instrument assembly per se. Each ring assembly carries a command bar (two of which collectively form the V-bar indicator in the instrument) on a cam follower which is pivotably mounted to the ring. Each of the cam follower elements includes a positioning pin which cooperates with a cam surface formed on the periphery of the other one of the two rings. The desired composite motions and displacement of the command bar assembly defined by the first and second command bar elements is attained in response to appropriate driving rotations of the ring assemblies either in concert or such as to impart relative rotation therebetween.

These and other features and objects of the present invention will become apparent upon reading the following description with reference to the accompanying drawings in which.

Figure 1:
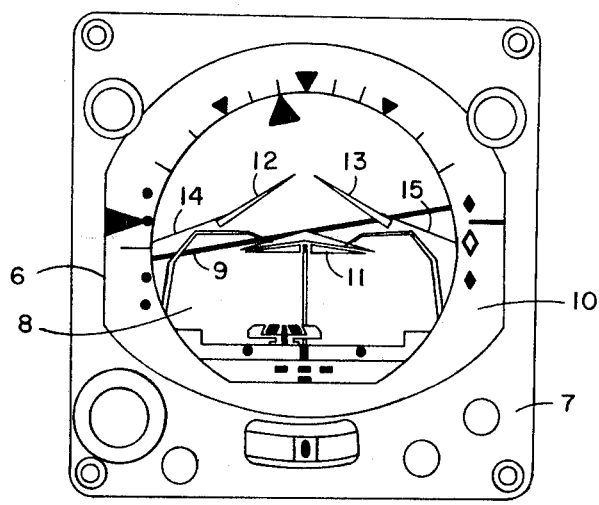
FIG. 1 is a plan view of an aircraft instrument including a command bar indicator assembly in accordance with the present invention.

An instrument of the type providing a combined attitude and command indication as described in the above referenced Schweighofer et al., patent is illustrated in FIG. 1. A front base plate 7 is formed with a viewing window or opening 6 behind which is mounted a display plate 10. Display plate 10 carries various references against which indications of bank, speed, glide slope deviation, etc. may be indicated. The display with which the present invention is related is visible through an opening in the display plate 10. A fixed delta-shaped aircraft symbol 11 is oriented symmetrically with respect to the longitudinal axis of the instrument. This delta symbol might represent the nose of the aircraft. First and second command bar indicator members 12 and 13, mounted on respective arms 14 and 15, are positionable with respect to the fixed aircraft reference symbol 11 to present pitch, bank and composite steering commands to the observer. A zero command is represented by the members 12 and 13 (which collectively define a V-bar indicator) being positioned so as to be aligned or juxtaposed with the transverse extremes of the delta symbol 11.

The members 12 and 13 are obliquely mounted with respect to their respective positioning arms 14 and 15 so as to define a plane which extends generally inwardly along the longitudinal horizontal line of sight axis of the instrument and which plane will be substantially coincident with that defined by the fixed delta aircraft symbol 11 under a condition of "zero" command. As depicted in FIG. 1, a pitch-up command is indicated by the plane defined by the command bars 12 and 13 being displaced above that of the delta aircraft symbol 11 and the apex of the V defined by the members 12 and 13 is pitched up with respect to the longitudinal horizontal line of sight axis of the instrument.

Presently employed mechanisms for positioning the command bar members 12 and 13 are generally complex. Further the arms 14 and 15 by means of which the command bar members 12 and 13 are positioned, because of the general complexity of the driving mechanism employed to position same, have necessarily been carried on arm members which extend along the edge of a tape drum which is rotationally driven for bank stabilization. The tape carried within the drum is translated vertically for pitch stabilization so as to provide an attitude indication by the general orientation of a tape carried horizon line as indicated in FIG. 1 by reference numeral 9. FIG. 1 illustrates that the aircraft is banked to the right with zero pitch attitude or nose-level attitude. Drive mechanisms for the command bar elements 12 and 13 carried on arms extended along the sides of the tape drum assembly must be mounted behind the command bar assembly and impose design limitations on the instruments as to the size of the tape member providing the attitude display. In general the diameter of the tape drum carrying the horizon line 9 is subject to constraints of the presence of command bar support posts which must extend along the edge of the tape drum assembly.

The present invention provides a means for mounting and completely implementing a drive mechanism to appropriately position the command bars 12 and 13 in this type of instrument which may be carried completely forward of the horizon indicating tape assembly employed in these instruments and which in addition may be implemented in a much more compact assembly and with less complex arrangement than provided by known mechanisms.

Figure 2:
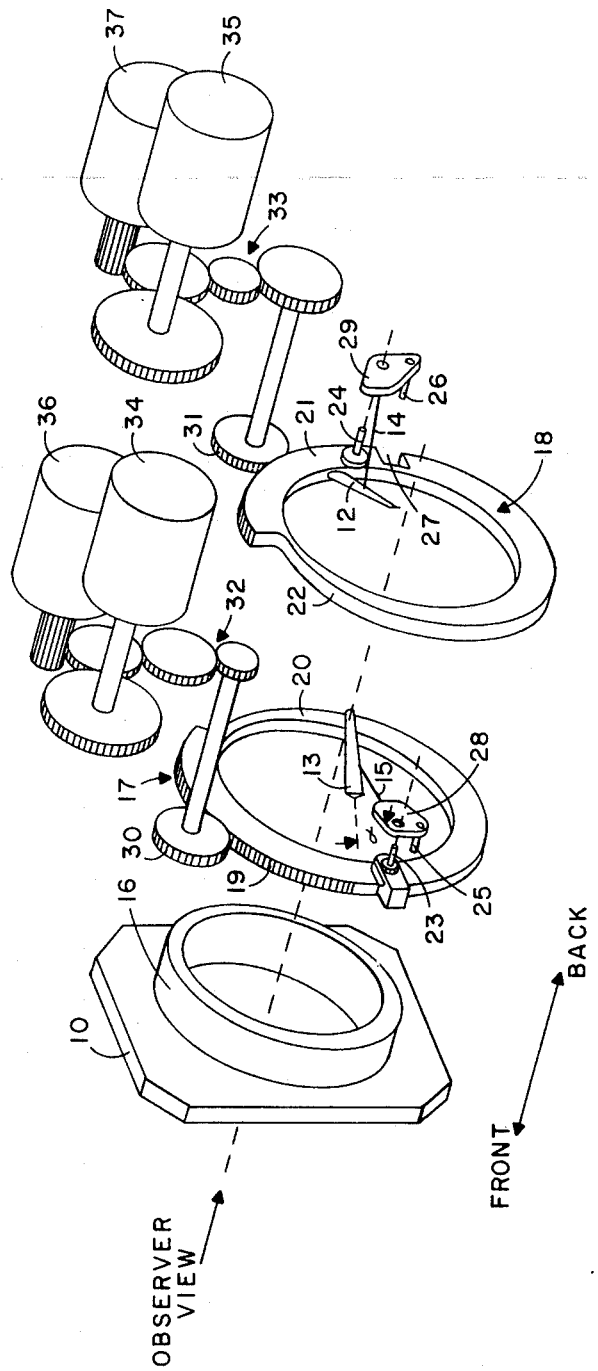
FIG. 2 is a functional mechanical representation of a command bar drive assembly in accordance with the present invention for incorporation into a type of instrument as depicted in FIG. 1.

The positioning mechanism of the present invention is depicted functionally in FIG. 2 wherein the interrelationship of rotational parts is illustrated without the inclusion of obviously necessary fixed mechanical supports for various driving and driven members.

As depicted in FIG. 2, the mechanism of the present invention basically consists of two thin circular rings rotatably mounted on a bearing surface extending from the forward display plate of the assembly. Each of the rings is formed with a cam surface over a predetermined portion of its periphery and a gear sector on at least a part of the remaining outside diameter of the ring. Each ring is provided with a cam follower/command bar support mechanism, a command bar pivot post, and a drive gear for imparting rotation of the ring.

Considering the assembly in more detail, the display plate member 10 is formed with an annular lip 16 which provides a bearing surface for the first and second ring members 17 and 18. Ring 17 is formed with a gear sector 19 extending over a portion of the outside diameter and a generally oppositely disposed camming surface 20. The periphery of ring 18 is similarly formed with a sector gear surface segment 21 and a generally oppositely disposed camming surface 22. Ring 17 carries a cam follower/command bar support mechanism which includes a torsion spring loaded cam follower 28 which is rotatably mounted upon a pivot post or pin 23. A mounting arm member 15 extends transversely inwardly towards the longitudinal horizontal line of sight axis of the instrument assembly from cam follower member 28 and carries command bar indicator 13. Command bar member 13 is fixed at an acute angle α with respect to the mounting arm 15 so as to comprise one side of the V-bar command configuration. A cam follower pin 25 extends transversely from the cam follower 28.

Similarly ring member 18 carries a cam follower/command bar support member including torsionally spring loaded cam follower 29 affixed to a second pin member 24. The other of the command bar indicator members 12 is affixed to member 29 by means of arm 14. A cam follower pin 26 is affixed to and extends transversely from the surface of cam follower 29.

Each of the cam follower/command bar support assemblies is generally oriented opposite the camming surface of the associated ring. In assembled relationship cam follower 28, which is rotatable with respect to ring 17, is driven by its associated follower pin 25 riding on the cam surface 22 of the other ring 18. Cam follower pin 26, associated with cam follower 29 of ring 18 is in driving engagement with the cam surface 20 formed on ring 17. Each of the rings is oriented so that its associated cam surface is adjacent to the command bar pivot point on the other ring and thus the cam follower of one ring rides on the cam surface of the other. Each cam follower rotates about the command bar pivot post associated with one ring and is spring loaded against the cam surface of the other.

Each of the rings 17 and 18 is free to rotate within a limited range with respect to the other ring and with respect to the display plate 10. Each ring may be driven independently by its own drive gear. Drive gear 30 is in driving relationship with the sector gear segment 19 formed on ring 17 while drive gear 31 provides a rotational drive for ring 18 by its driving relationship with the sector gear segment 21 on ring 18. Drive gear 30 may thus rotate ring 17 in response to a rotational input imparted through a gear train 32 by a first drive motor 36. Motor 36 might comprise the driving element of a servo positioning system including feedback synchro 34 employed to control the rotation of ring 17. Similarly drive gear 31 associated with ring 18 may be driven through a gear train 33 in response to rotation of a second motor 37 which in conjunction with synchro 35 comprises a further servo positioning system.

Upon initial assembly, the display plate 10 may be attached to the front of the instrument 7 as depicted in FIG. 1, the command bars 12 and 13 and aircraft symbol 11 installed, and the entire assembly adjusted to position each of the command bar elements 12 and 13 into juxtaposition with the transverse extremes of the reference symbol 11 (the zero command relationship). In operation, any deviation of the command bars 12 and 13 from this nulled position will indicate a maneuver command to the pilot as previously described.

To visualize the operation, a situation might be considered where the pilot is commanded to bank the aircraft to the right. In this case the "V" formed by the command bars 12 and 13 is caused to rotate clockwise with respect to the aircraft reference symbol 11 (as viewed from the observer's view or front of the instrument). This motion is accomplished by the mechanism of FIG. 2 by driving both of the rings 17 and 18 in a clockwise direction (as viewed from the front) by the same magnitude. In so driving each of the rings there is no relative motion between the two, and, no cam action upon either of the cam followers since the cam follower drive pins experience no change in position on the cam surface of the other one of the rings. Therefore, the command bars 12 and 13 rotate simultaneously in a clockwise direction to approximately indicate a right bank command to the pilot.

Now considering a situation where a climb attitude is commanded, the V defined by the command bars 12 and 13 must rise above the fixed aircraft symbol 11. The mechanism of FIG. 2 accomplishes this motion by causing the ring member 17 to be driven counterclockwise as viewed from the front of the instrument while simultaneously driving ring member 18 clockwise. If these rotations are imparted simultaneously by the same magnitude, each of the command bars 12 and 13 is raised above the fixed aircraft reference symbol 11. If pure rotation of the ring members 17 and 18 were the only motion imparted, command bars 12 and 13 would remain pointed at the nose of the aircraft symbol 11 resulting in an ambiguous command. Since, however, a relative motion is now experienced between the rings, cam action enters the picture. Command bar 13 is caused to rotate clockwise (as viewed from the front of the instrument) about its pivot axis defined by pin member 23, while command bar 12 rotates counterclockwise by an equal amount. This motion, combined with the ring rotations, causes the "V" defined by the two command bars to rise in response to a pitch-up or climb command and the apex of the "V" is simultaneously pitched-up with respect to the longitudinal horizontal line of sight axis of the instrument, resulting in the desired command indication.

The manner in which the pivoting action of the mounting arms 15 and 14 associated with the command bar indicators 13 and 12 causes a pitching up or pitching down of the apex of the V formed by the two indices 12 and 13 may thus be appreciated by consideration of the FIG. 2 embodiment wherein the command indicator 13 is indicated as lying in a plane with its associated mounting arm 15 and so mounted as to form an acute angle α with respect thereto. The cam follower 28, to which the arm 15 is affixed and extends in a coplanar fashion, rotates about an axis transverse of its surface, and thus rotation of cam follower 28 with respect to its pivot axis 23 moves the associated command indicator bar 13 such that its motion describes or follows the surface of a truncated cone.

As depicted in FIG. 2, clockwise (as viewed from the front) rotation of the cam follower 28 about its pivot axis 23 causes member 13 to rise not only upwardly with respect to the longitudinal horizontal line of sight axis of the instrument but inherently the furthermost tip as viewed by the observer necessarily pitches upwardly. This action considered in conjunction with a like motion of the other indicator segment, causes the plane defined by the members 12 and 13 to rise and pitch upwardly in response to pitch-up commands. Conversely a pitch-down command causes the plane defined by the two members 12 and 13 to sink below the aircraft reference symbol 11 with a simultaneous pitching down of the plane defined by the two members 12 and 13.

It follows that the mechanism of FIG. 2 can display oppositely directed pitch and roll commands by appropriate rotation of the two ring members and also can display composite or combination pitch and roll commands within the desired range of motion of the drive mechanism. A combination pitch and bank command can be formulated by simultaneously rotating the rings in one direction or the other to effect bank command and by imparting appropriate differential rotation between the two rings to raise or lower the command bar members 12 and 13 as appropriate to command pitch.

Input pitch and bank command signals, as might be formulated in a flight director computer, may then be differentially combined and applied to first and second servo positioning systems of which the motors 35 and 36 of FIG. 2 form an integral part.

Figure 3:
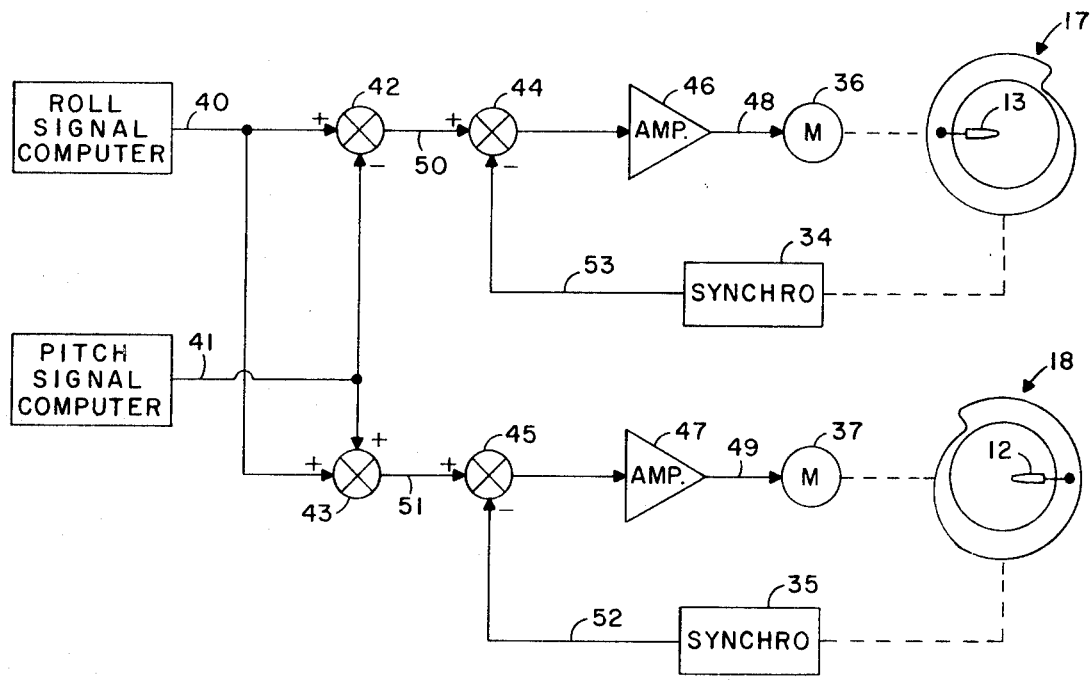
FIG. 3 is a functional diagram of a means for driving the mechanism of the present invention.

Reference is made to FIG. 3 in which an arrangement to appropriately drive the mechanism of FIG. 2 is diagrammatically displayed. Roll command signals as might be formulated in a steering computer are applied on line 40 while pitch command signals are applied on line 41. A first signal mixing means 42 combines the roll and pitch input signals in a subtractive sense, that is, the pitch signal is subtracted from the roll signal. Line 50 applies the difference between the roll and pitch input signals to a further mixing means 44 the output of which is applied to a servo amplifier 46 to provide a motor drive signal on line 48 for control of motor 36 which drives ring 17. Through the gear drive arrangement depicted in FIG. 2, the synchro 34 provides a position feedback signal on line 53 to be applied in a subtractive sense at mixer 44. Ring 17 is then seen to be servo positioned in response to the pitch and roll signals being combined in an additive sense.

Ring 18 is driven by a second servo system including motor 37 and feedback position synchro 35. The pitch and roll signals on lines 41 and 40 are applied to a further mixer 43 in an additive sense. The composite output corresponding to the sum of the two signals is applied on line 43 as a first input to mixer 45 which receives the feedback signal from synchro 35 on a second input line 52. The output from mixing means 45 is applied to servo amplifier 47 to provide a motor drive signal 49 for motor 37.

The driving arrangement depicted in FIG. 3 shows the signals combined in proper additive or subtractive sense to properly position the command bar indicators 12 and 13 under the following assumptions:

| Roll Command (+) | Command bars CCW (Viewed from rear) |
| --- | --- |
| (−) | Command bars CW (Viewed from rear) |
| Pitch Command (+) | Command bars UP |
| (−) | Command bars DOWN |
| + Roll Signal, Motor 37 +, Motor 36 + | |
| − Roll Signal, Motor 37 −, Motor 36 − | |
| − Pitch Signal, Motor 37 −, Motor 36 + | |
| + Pitch Signal, Motor 37 +, Motor 36 − | |

An alternative drive arrangement (not illustrated) might employ the servos to develop shaft output rotations corresponding respectively to the pitch and roll command inputs per se, and include mechanical differential means and appropriate gear trains to effect the desired differential combinations to drive the rings 17 and 18.

The present invention is thus seen to provide in a simple compact mechanism comprised of a minimum of coacting parts a drive mechanism by means of which a pair of command indicator members may properly be positioned to provide a pictorial steering command.

Although the present invention has been described with respect to a particular embodiment thereof, it is not to be so limited as changes might be made therein which fall within the scope of the invention as defined in the appended claims.

I claim:

1. In a steering command indicator wherein the aircraft is represented by a fixed reference symbol symmetrically oriented about the longitudinal horizontal line of sight axis of the indicator and including first and second indicating command members lying in and defining a plane positionable with respect to said longitudinal axis, means for simultaneously positioning said first and second indicating members such that the plane defined thereby is rotatable about said longitudinal axis and translatable transversely of said longitudinal axis, said positioning means comprising first and second rotating ring members mounted concentrically about said longitudinal axis, each of said ring members carrying on the periphery thereof a camming surface over a predetermined portion thereof, said first and second indicating members each being carried on a mounting arm extending generally radially inwardly from one of said ring members, each arm member being pivotable about an axis transverse of one of said ring members, first and second cam follower means, each cam follower means being in camming engagement with the camming surface on the other one of said ring members, means for generating bank and pitch command signals, ring driving means for rotating said ring members in the same direction by the same magnitude in response to said bank command signals, said ring driving means rotating said ring members in respective opposite directions by the same amount in response to said pitch command signals, said ring driving means further being responsive to the simultaneous application thereto of both said bank and pitch command signals to rotate said ring members in the same direction by different magnitudes to effect both rotation and transverse displacement of the plane defined by said first and second indicating members with respect to said longitudinal axis.

2. A command indicator as defined in claim 1 wherein each of said ring members is formed with a gear sector on a portion of the periphery thereof, a driving gear engaging each of said gear sectors, and said driving gears being rotated in response to respective first and second shaft outputs from said positioning means.

3. A command indicator as defined in claim 2 wherein said first and second indicator members are formed with a predetermined longitudinal dimension and mounted on their respective mounting arms so as to extend radially inwardly toward said longitudinal axis of said indicator to define a composite configuration the apex of which is directed away from the observer, said fixed referenced symbol being generally delta shaped, and said positioning means in the absence of said input command signals being adapted to position said indicating members such that the plane defined thereby is substantially coincident with that of said fixed delta aircraft symbol.

4. An indicator as defined in claim 3 wherein said driving means for said ring members comprises means for rotating a first one of said rings in response to the algebraic summation of bank and pitch command input signals and means for rotating the other of said ring members in response to the algebraic difference between said pitch and bank command signals.

5. An indicator as defined in claim 4 wherein the other of said rings is rotated in response to the algebraic subtraction of the pitch command input signal from the bank command input signal.

6. An indicator as defined in claim 5 wherein said driving means comprises respective first and second servo positioning means each including a servo amplifier, the servo amplifier associated with the first one of said servo positioning means developing an output signal proportional to the algebraic summation of input roll and pitch command signals, the servo amplifier associated with the second one of said servo positioning means developing an output signal corresponding to the algebraic subtraction of input pitch command signal from input roll command signal.

7. An indicator as defined in claim 6 wherein said first and second servo positioning means include respective ones of said driving gears.

8. Indicating means as defined in claim 3 wherein said cooperative engagement between the cam followers associated with each of the first and second indicator mounting arms effects a rotation of the associated indicating member by its camming relationship with the camming surface on the other of said rings such that relative rotation between said first and second ring members in a first sense effects a simultaneous inclination of the apex of the V-configuration defined by said first and second indicators for pitch up command and a simultaneous declination of the apex of the V defined by said indicating members for pitch down command.

* * * * *